(12) United States Patent
Stone et al.

(10) Patent No.: US 6,765,368 B2
(45) Date of Patent: Jul. 20, 2004

(54) ELECTRICAL ENERGY APPARATUSES, ELECTRICAL ENERGY CONDITIONING CIRCUITS, AND ELECTRICAL SUPPLY METHODS

(75) Inventors: Lawrence Stone, Austin, TX (US); John Cummings, Round Rock, TX (US)

(73) Assignee: Valence Technology, Inc., Henderson, NV (US)

( * ) Notice: Subject to any disclaimer, the term of this patent is extended or adjusted under 35 U.S.C. 154(b) by 0 days.

(21) Appl. No.: 10/723,345

(22) Filed: Nov. 26, 2003

(65) Prior Publication Data

US 2004/0108839 A1 Jun. 10, 2004

Related U.S. Application Data

(63) Continuation of application No. 10/072,827, filed on Feb. 8, 2002, now Pat. No. 6,667,599.

(51) Int. Cl.$^7$ ........................ H01M 10/44; H01M 10/46
(52) U.S. Cl. ..................................................... 320/131
(58) Field of Search ................................ 320/119, 128, 320/131, 132, 134, 135, 136, 140, 163

(56) References Cited

U.S. PATENT DOCUMENTS 5,621,301 A 4/1997 Allen et al.
5,942,877 A 8/1999 Nishimura
6,191,552 B1 2/2001 Kates et al.
6,667,599 B2 * 12/2003 Stone et al. ................. 320/112

OTHER PUBLICATIONS

U.S. patent Ser. No. 09/484,799; entitled "Lithium–based Active Materials and Preparation Therof"; Jeremy Barker; filed Jan. 18, 2000.
"Power Pad, Electrovaya's Extended Lif Laptop Computer Battery"; http://www.fivestaradvantage.com/electrofuel/; May 13, 2002; 2 pps.
"Targue Universal Auto Air Notebook Power Adapter For Apple, Dell, Gateway, HP, and Sony"; http://www.port.com/default_product.asp?sku=PA380U; May 23, 2002; 3 pp.

* cited by examiner

Primary Examiner—Edward H. Teo
(74) Attorney, Agent, or Firm—Wells St. John, P.S.

(57) ABSTRACT

Power supply apparatuses and methods of supplying electrical energy are provided. According to one aspect, a power supply apparatus includes an electrochemical device configured to store electrical energy, a first interface coupled with the electrochemical device and adapted to couple with a supply configured to provide electrical energy and a first load configured to receive electrical energy, and charge circuitry coupled intermediate the first interface and the electrochemical device, wherein the charge circuitry is configured to monitor a quantity of electrical energy supplied from the supply to the first load and to control a supply of electrical energy to the electrochemical device responsive to the monitoring and to charge the electrochemical device.

44 Claims, 13 Drawing Sheets

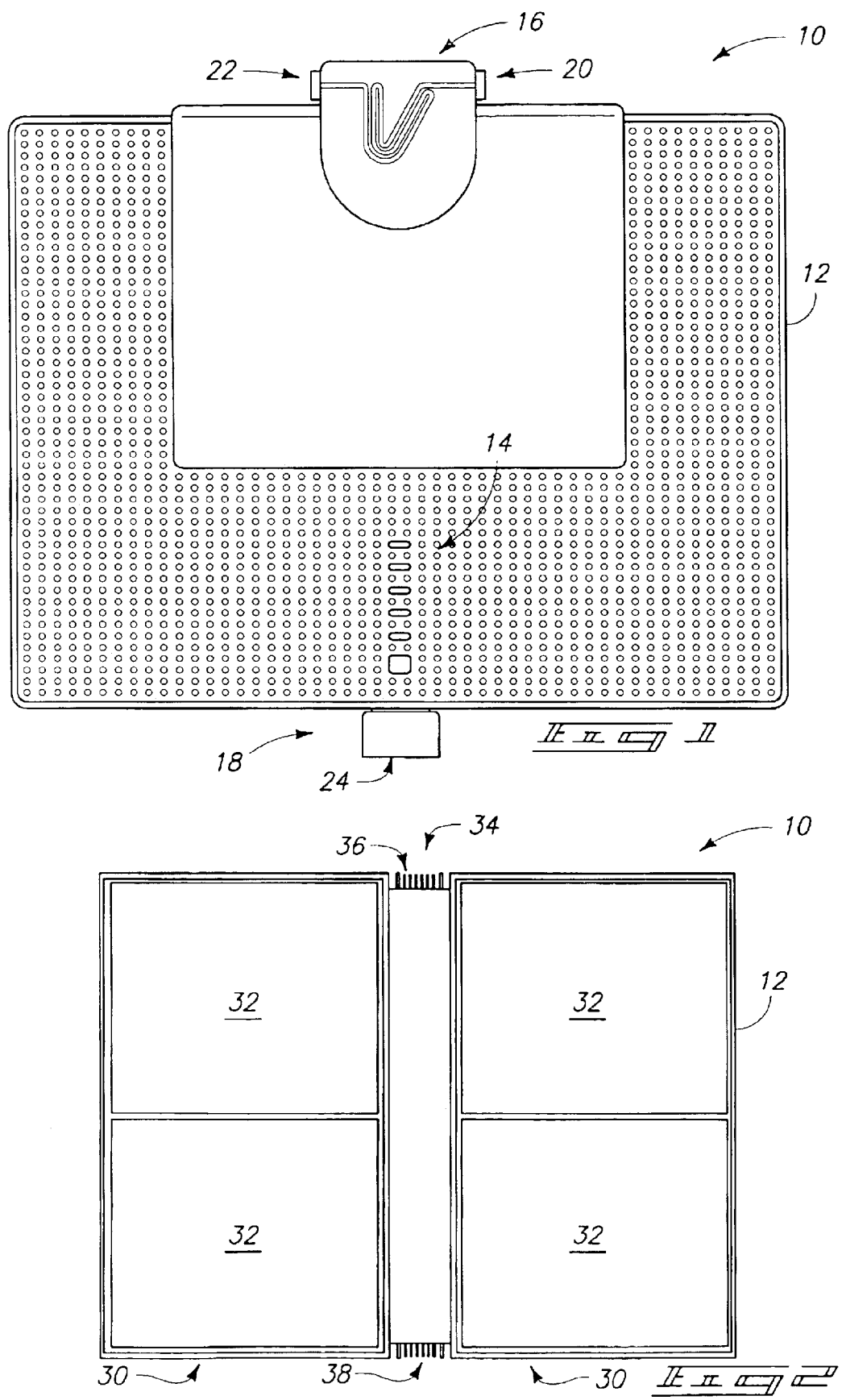

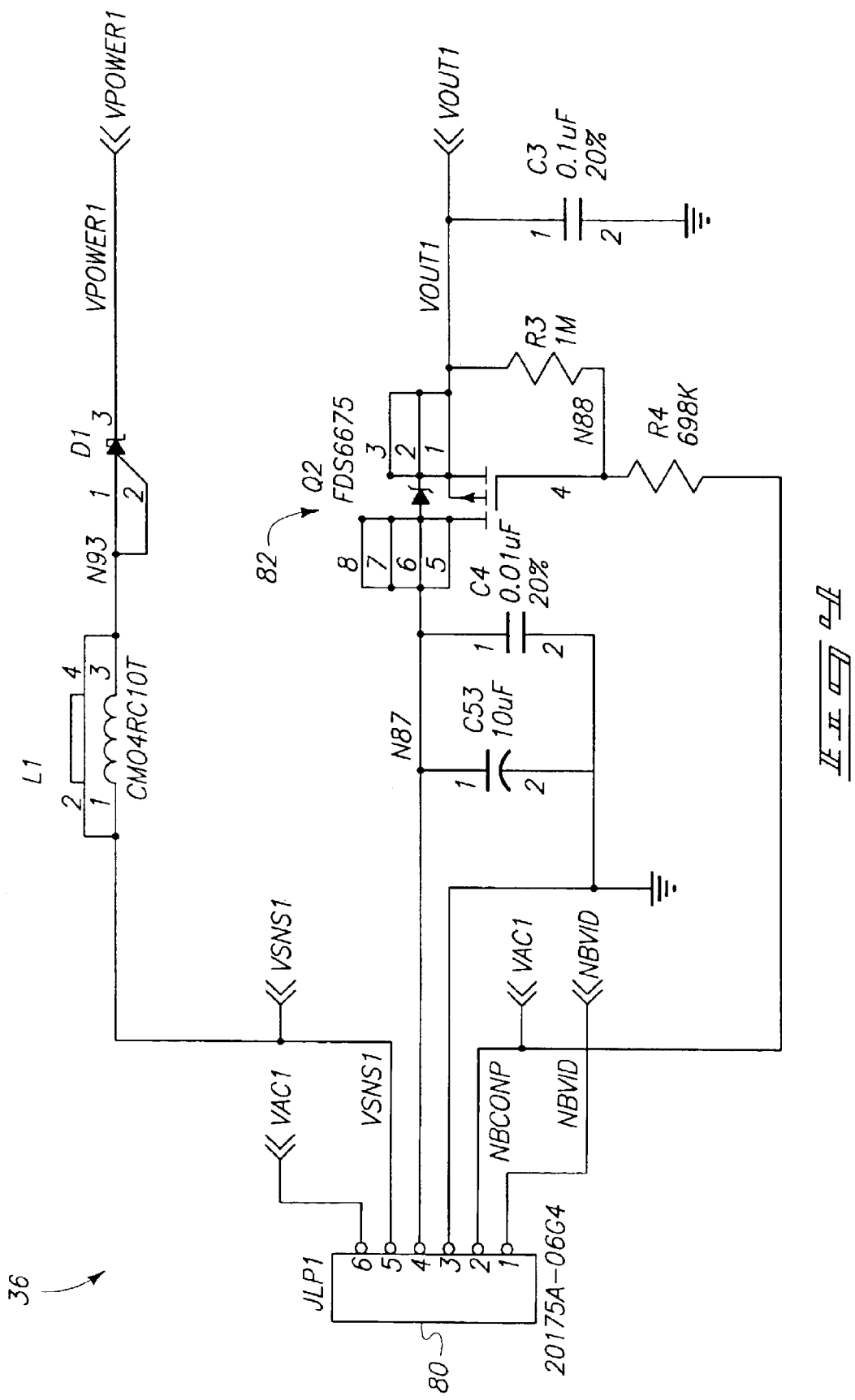

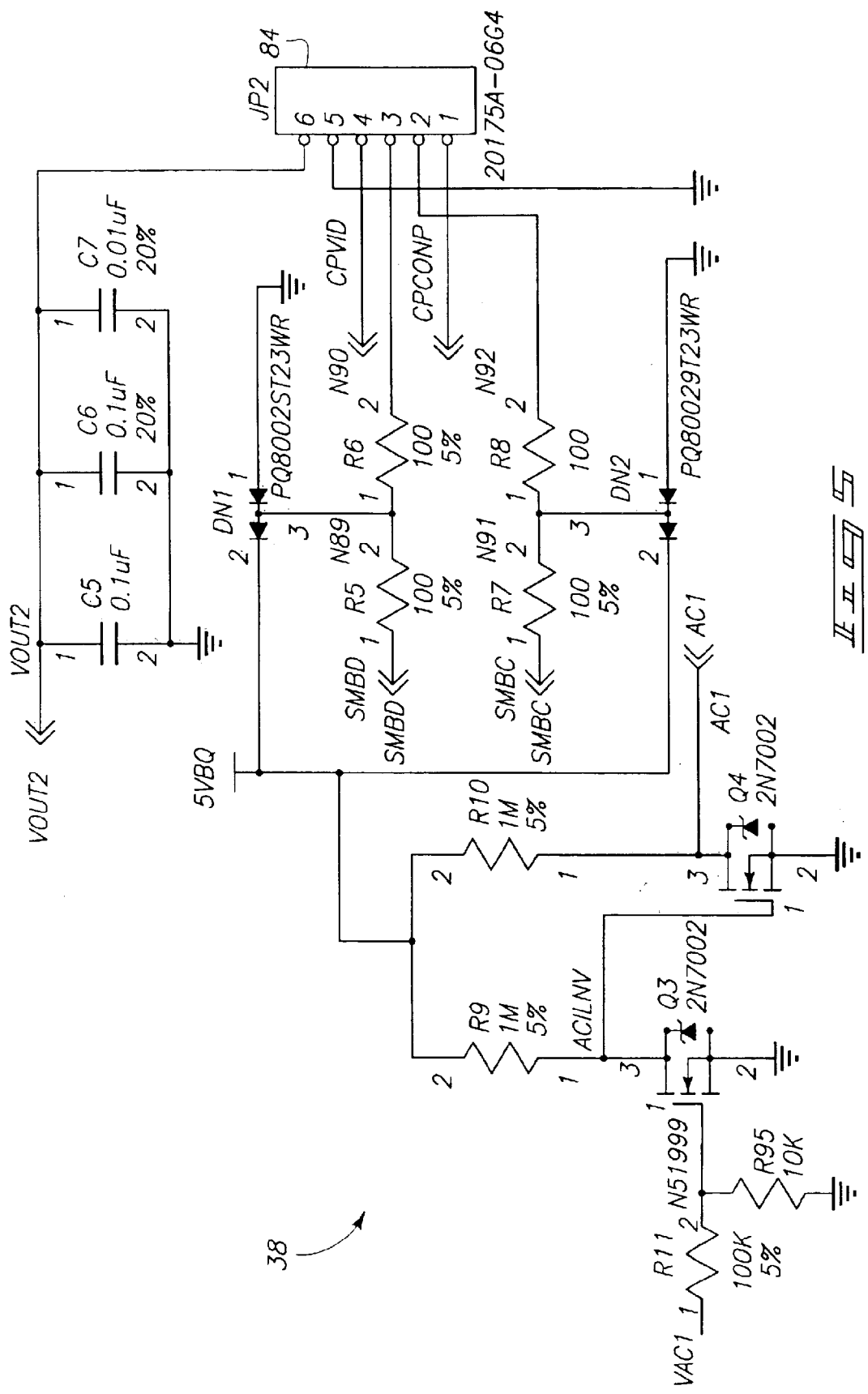

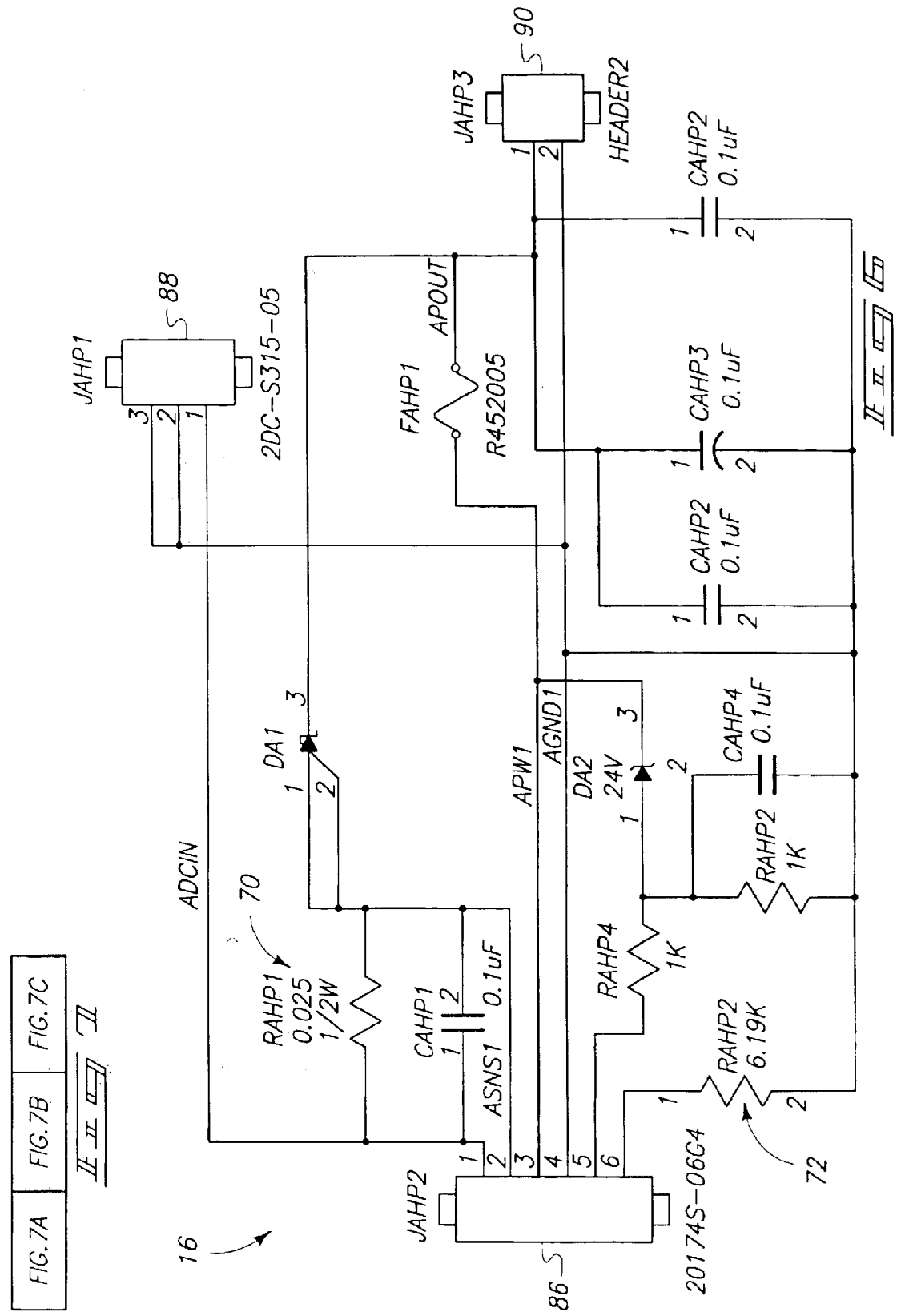

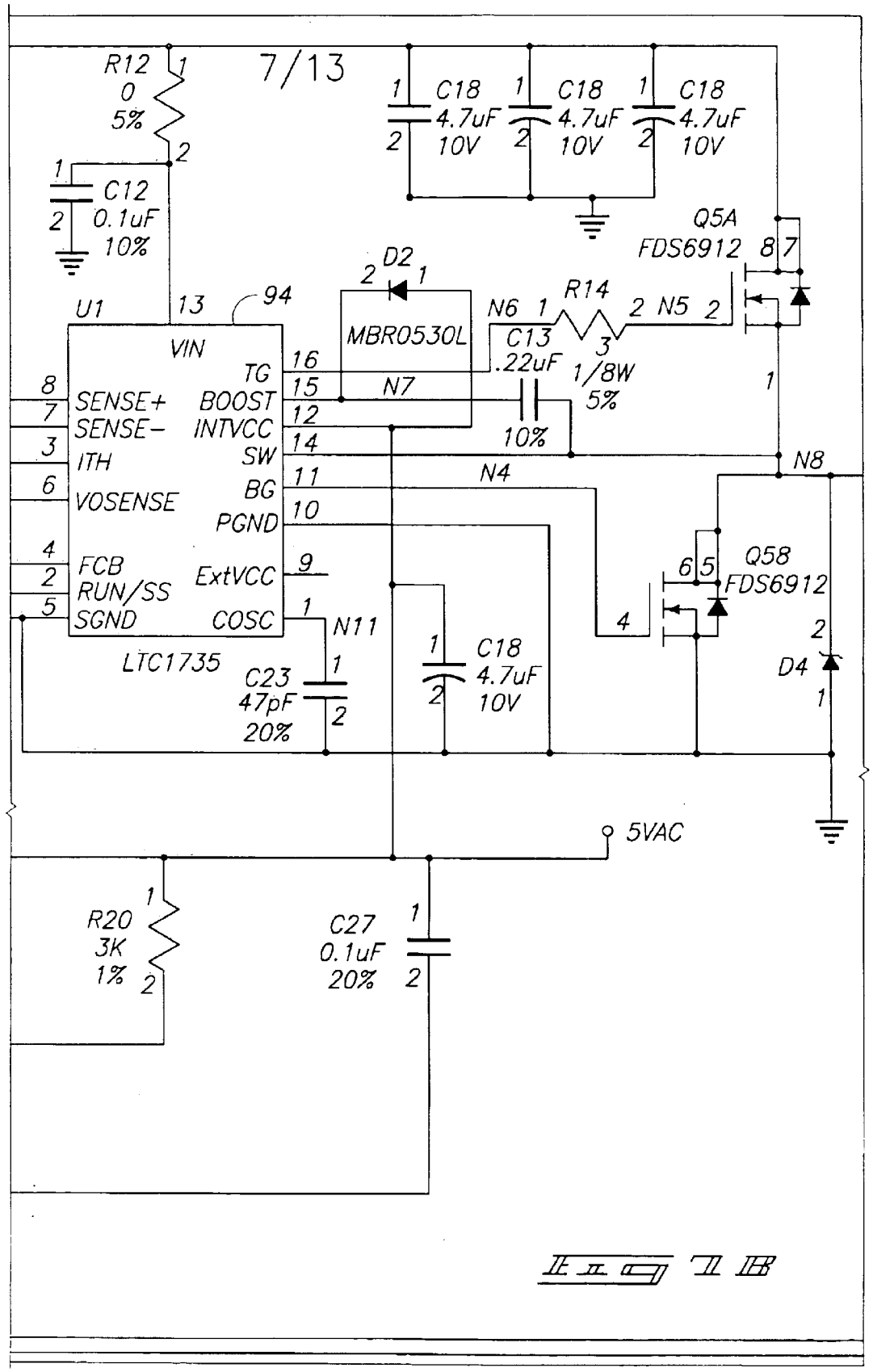

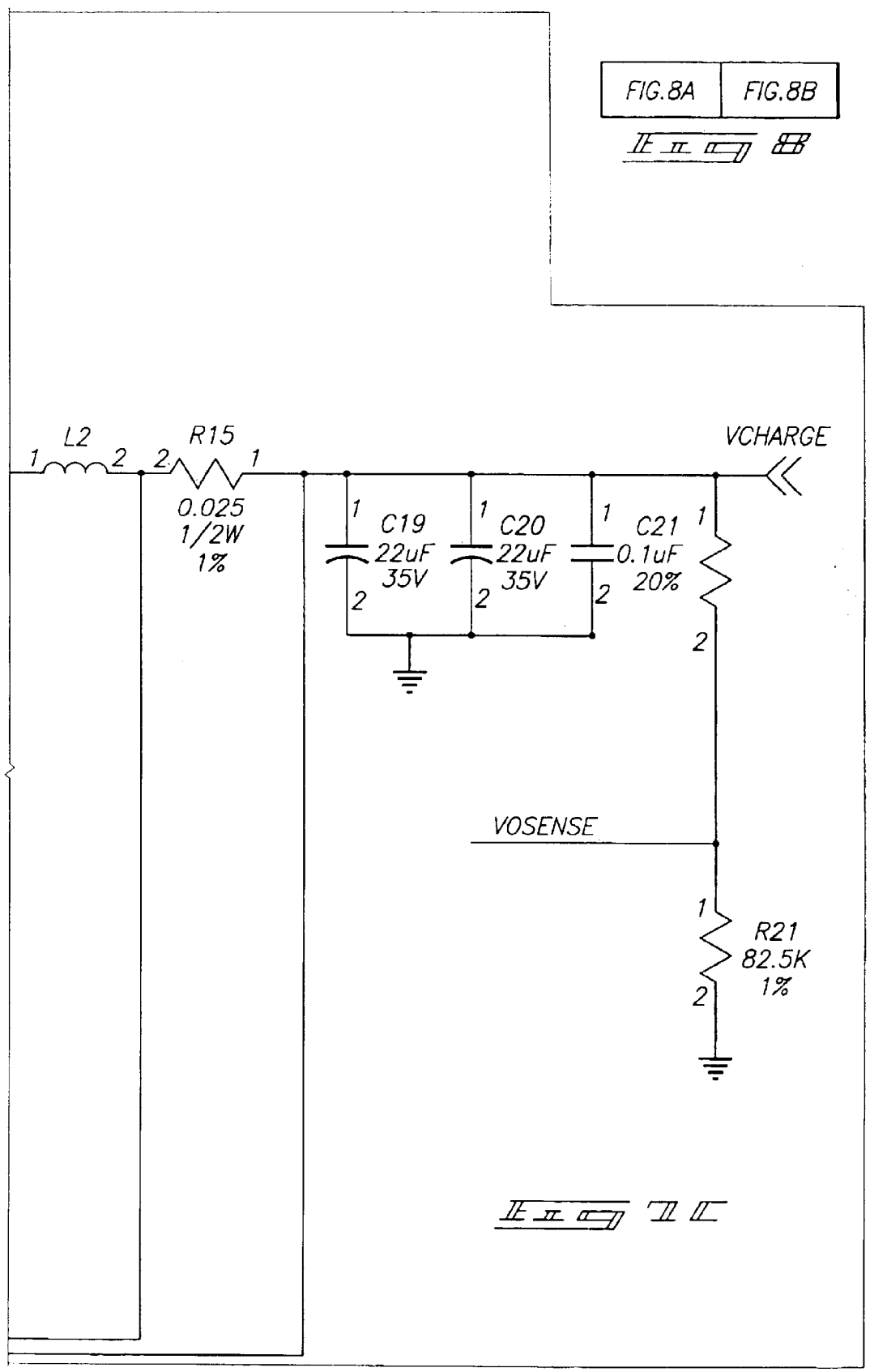

ELECTRICAL ENERGY APPARATUSES, ELECTRICAL ENERGY CONDITIONING CIRCUITS, AND ELECTRICAL SUPPLY METHODS

RELATED PATENT DATA

The present application is a continuation of and claims priority to U.S. patent application Ser. No. 10/072,827 filed on Feb. 8, 2002 now U.S. Pat No. 6,667,599, entitled "Power Supply Apparatuses and Method Supplying Electrical Energy", naming Lawrence Stone and John Cummings as inventors, and the disclosure of which is incorporated herein by reference.

TECHNICAL FIELD

This invention relates to power supply apparatuses and methods of supplying electrical energy.

BACKGROUND OF THE INVENTION

The sophistication and uses of electrical devices have increased dramatically in recent years. Consumer items having electrical components are ubiquitous in communications, computing, entertainment, etc. The size of mobile telephones, notebook computers, music players, and other devices has continued to decrease while the capabilities and quality of the devices continues to increase as modern electronic components used in such devices are developed and improved upon.

Numerous people rely upon or have grown accustomed to usage of electrical consumer devices for business, education, or for other needs. Electronic consumer devices are increasingly portable to accommodate these needs during travels from home or the workplace. The sophistication and capabilities of power supplies for such devices have also improved to meet the requirements of the electronic consumer devices. For example, cost, size, and capacity are some product characteristics which have been improved for the portable power supplies for electronic applications. There is a desire to enhance these and other design parameters of power supplies, including portable power supplies, to accommodate increasing power requirements of modern electronic consumer devices.

BRIEF DESCRIPTION OF THE DRAWINGS

Preferred embodiments of the invention are described below with reference to the following accompanying drawings.

FIG. 1 is an illustrative representation of an exemplary power supply apparatus according to aspects of the present invention.

FIG. 2 is an illustrative representation of exemplary internal components of the power supply apparatus illustrated in FIG. 1.

FIG. 4 is a schematic diagram of an exemplary first interface of a power supply apparatus.

FIG. 5 is a schematic diagram of an exemplary second interface of a power supply apparatus.

FIG. 6 is a schematic diagram of an exemplary high-power connector of a power supply apparatus.

FIG. 7 is a map illustrating how FIGS. 7A–7C are to be arranged.

FIGS. 7A–7C are schematic diagrams of exemplary charge circuitry of a power supply apparatus.

FIG. 8 is a map illustrating how

FIGS. 8A–8B are schematic diagrams of an exemplary boost converter of a power supply apparatus.

FIG. 10 is a map illustrating how

FIGS. 10A–10B are schematic diagrams of an exemplary step-down converter of a power supply apparatus.

DETAILED DESCRIPTION OF THE PREFERRED EMBODIMENTS

Figure 3:
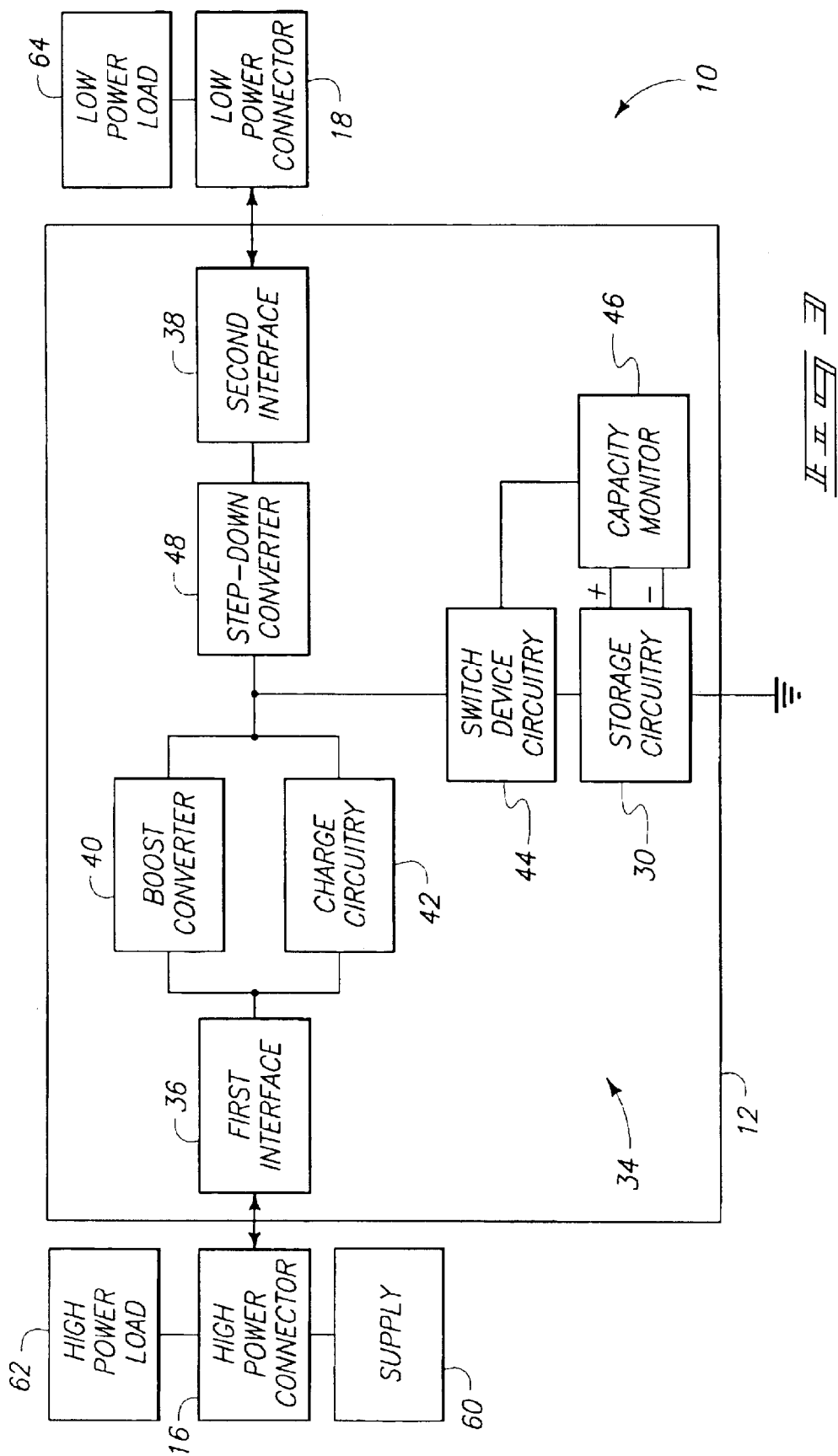
FIG. 3 is a functional block diagram illustrating components of an exemplary power supply apparatus according to aspects of the present invention.

This disclosure of the invention is submitted in furtherance of the constitutional purposes of the U.S. Patent Laws "to promote the progress of science and useful arts" (Article 1, Section 8).

According to one aspect of the invention, a power supply apparatus comprises an electrochemical device configured to store electrical energy, a first interface coupled with the electrochemical device and adapted to couple with a supply configured to provide electrical energy and a first load configured to receive electrical energy and charge circuitry coupled intermediate the first interface and the electrochemical device, wherein the charge circuitry is configured to monitor a quantity of electrical energy supplied from the supply to the first load and to control a supply of electrical energy to the electrochemical device responsive to the monitoring and to charge the electrochemical device.

According to a second aspect of the invention, a power supply apparatus comprises an electrochemical device configured to store electrical energy, a first interface coupled with the electrochemical device and adapted to couple with a supply configured to provide electrical energy and a first load configured to receive electrical energy and a boost converter coupled intermediate the electrochemical device and the first interface and configured to receive electrical energy from the electrochemical device, to operate in an enabled mode of operation to increase a voltage of the electrical energy received from the electrochemical device and to provide the electrical energy of the increased voltage to the first interface for application to the first load, to detect a presence of the supply, and to operate in a disabled mode of operation wherein the boost converter ceases provision of the electrical energy to the first interface responsive to the detection of the presence of the supply.

According to another aspect of the invention, a power supply apparatus comprises electrical energy storage circuitry comprising a lithium cell having a lithium-mixed metal electrode, an interface coupled with the storage circuitry and adapted to couple with a supply configured to provide electrical energy and a load configured to receive electrical energy and circuitry coupled intermediate the interface and the electrochemical device, wherein the circuitry is configured to apply electrical energy from the supply to the storage circuitry to charge the storage circuitry and to apply electrical energy from the storage circuitry to the interface for application to the load.

Another aspect of the invention provides a method of supplying electrical energy comprising first applying electrical energy from a supply to a load, second applying electrical energy from an electrochemical device to the load, charging the electrochemical device using electrical energy from the supply, monitoring the first applying and controlling the charging responsive to the monitoring According to another aspect of the invention, a method of supplying electrical energy comprises providing electrical energy using an electrochemical device, adjusting an electrical characteristic of the electrical energy from the electrochemical device, providing the electrical energy from the electrochemical device to a load after the adjusting, detecting the presence of a supply and ceasing the providing of the electrical energy from the electrochemical device to the load responsive to the detecting.

According to yet another aspect of the invention, a method of supplying electrical energy comprises providing a battery comprising a plurality of electrochemical devices individually comprising a lithium cell having a lithium-mixed metal electrode, coupling a supply with the battery, coupling the lithium cells with a load, charging the lithium cells using the supply, disconnecting the supply and applying electrical energy from the lithium cells to the load when the supply is disconnected from the load.

Referring to FIG. 1, an exemplary arrangement of a power supply apparatus 10 according to aspects of the present invention is shown. Power supply apparatus 10 is arranged to provide electrical energy to one or more load (not shown in FIG. 1). In at least one aspect of the present invention, power supply apparatus 10 is arranged to provide high-power electrical energy to high-power loads having power ratings, for example, in excess of 20 watts (and having exemplary operational voltages of 16–20 Volts or more)and low-power electrical energy to low-power loads having power ratings, for example, less than 20 watts (and having exemplary operational voltages less than 12 Volts).

In exemplary applications, power supply apparatus 10 is arranged as a portable device configured to provide portable electrical energy to portable loads or devices. Exemplary high-power loads include notebook computers and exemplary low-power loads include personal digital assistants (PDAs), mobile telephones, etc. Power supply apparatus 10 may be utilized to provide electrical power to other devices or may be configured in other arrangements to power devices of other wattage ratings The particular arrangement of power supply apparatus 10 may be modified and tailored to accommodate the energy requirements of the utilized load(s). Power supply apparatus 10 may be utilized to provide electrical energy to one load (e.g., one high-power load or low-power load) at a given moment in time, or simultaneously provide electrical energy to one or more high-power load or one or more low-power load. Other arrangements besides portable energy applications including permanent arrangements or semi-permanent arrangements for providing electrical energy may also be implemented.

The illustrated exemplary power supply apparatus 10 includes a housing 12 configured to house electrical energy storage circuitry (exemplary storage circuitry is shown in FIG. 2). The depicted arrangement of power supply apparatus 10 shown in FIG. 1 includes one or more indicator 14 configured to provide charge status information of storage circuitry and/or power supply apparatus 10. In the depicted exemplary embodiment, indicator 14 is implemented as a plurality of light emitting diodes (LEDs).

The depicted power supply apparatus 10 further includes a first connector 16 and a second connector 18. First connector 16 and second connector 18 are configured to couple with external devices or loads and to supply electrical energy to loads coupled therewith and/or receive electrical energy from a supply coupled therewith. Connectors 16, 18 have appropriate receptacle(s) to accommodate cables or other connections utilized for coupling with the respective individual loads and/or supply. In the depicted exemplary arrangement, first connector 16 includes a receptacle 20 configured to receive a cable or other connection to couple with an external supply (not shown) and a second receptacle 22 configured to receive a cable or other connection for coupling with a load. Connector 18 includes a receptacle 24 which is configured to couple with a load in the illustrated configuration.

An appropriate supply (shown in FIG. 3) can comprise any convenient source of electrical power, such as a utility line, generator, alternator, etc. If the supply is implemented as an alternating current supply, a rectifier (not shown) may be utilized to provide direct current electrical energy. Power supply apparatus 10 is configured to provide such received electrical energy to a load coupled with receptacle 22 and/or to utilize such received electrical energy to charge storage circuitry of apparatus 10. Electrical energy stored within power supply apparatus 10 may also be provided to a load coupled with receptacle 22 or to a load coupled with second connector 18.

As mentioned previously, power supply apparatus 10 is arranged to supply electrical power to loads of different configurations and having different energy ratings or requirements for proper operation. For example, a first load may require or utilize electrical energy of a first voltage while another appropriate load may utilize electrical energy of a second voltage. In the described exemplary configuration, first connector 16 is a high-power connection and second connector 18 is a low-power connection.

A plurality of possible connectors 16, 18 are available to provide appropriate connection of power supply apparatus 10 with respective loads. Once a load is identified, the appropriate connector corresponding thereto is selected by the user and utilized to couple apparatus 10 with the load and/or supply. Connectors 16, 18 are configured to provide appropriate electrical energy to corresponding load devices and also configure power supply apparatus 10 as described further below.

Referring to FIG. 2, additional details of an exemplary power supply apparatus 10 are described. The depicted arrangement of power supply apparatus 10 includes electrical energy storage circuitry 30 configured to receive, store and supply electrical energy.

Storage circuitry 30 includes one or more electrochemical device 32 in exemplary embodiments. In the illustrated arrangement of FIG. 2, four electrochemical devices 32 are provided and are coupled in series to form a battery. According to one embodiment of the invention, electrochemical devices 32 are individually implemented as a lithium cell having a lithium-mixed metal electrode. Further details regarding an exemplary lithium cell having a lithium-mixed metal electrode are discussed in U.S. patent application Ser. No. 09/484,799, entitled "Lithium-based Active Materials and Preparation Thereof", listing Jeremy Barker as an inventor, filed Jan. 18, 2000, and incorporated herein by reference.

A particular configuration of power supply apparatus 10 may be dictated by an application in which it will be used to supply electrical energy. Electrochemical devices 32 implemented as lithium cells individually having a lithium-mixed metal electrode are individually configured in at least one arrangement to provide a voltage of approximately 3.7 Volts in a substantially charged state or condition. In the depicted exemplary arrangement, four electrochemical devices 32 are coupled in series to provide electrical energy to an appropriate load. In such a configuration, electrical energy is provided at a variable voltage range of 8 to 14.8 Volts from storage circuitry 30 with a nominal voltage of 13.2 Volts during typical operations.

In another possible embodiment, two banks of devices 32 are coupled in parallel to provide the electrical energy. Individual banks may include four such electrochemical devices 32 arranged in series. In an exemplary configuration comprising four series arranged electrochemical devices 32, power supply apparatus 10 may be utilized in 60 watt applications. In the configuration including eight electrochemical devices 32, power supply apparatus 10 may be utilized to provide electrical energy in 130 watt applications. Other configurations of power supply apparatus 10 including more or less cells arranged in series and/or parallel are contemplated and may be utilized in other energy applications having other energy current, voltage or wattage specifications.

Power supply apparatus 10 additionally includes circuitry 34 configured to control and monitor operations of apparatus 10. For example, circuitry 34 controls and implements charging, maintenance, and discharging of electrochemical devices 32 as well as conditioning of electrical energy extracted from electrochemical devices 32.

Exemplary circuitry 34 includes a first interface 36 and a second interface 38. First and second interfaces 36, 38 are individually configured to electrically couple with a respective one of first connector 16 and second connector 18. In the depicted exemplary embodiment, first and second interfaces 36, 38 comprise a plurality of electrical connection pins configured to mate with respective electrical connections such as receptacles (not shown) of connectors 16, 18. Connectors 16, 18 and interfaces 36, 38 are configured for removable electrical coupling enabling different configurations of first and second connectors 16, 18 to be utilized with the power supply apparatus 10 and corresponding to the loads and supplies to be coupled with apparatus 10. Further details regarding one possible arrangement of circuitry 34 are discussed herein with respect to the block diagram of FIG. 3 and schematic diagrams depicted in FIGS. 4–10.

Referring to FIG. 3, operations of one exemplary embodiment of power supply apparatus 10 are described with respect to a plurality of components of circuitry 34 of apparatus 10. The depicted electrical components of circuitry 34 are illustrated within housing 12 in the described arrangement. Such may be implemented using a printed circuit board.

In accordance with one exemplary embodiment, circuitry 34 includes storage circuitry 30, first interface 36, second interface 38, a boost converter 40, charge circuitry 42, switch device circuitry 44, a capacity monitor 46, and a step-down converter 48. Components intermediate switch device circuitry 44 and first interface 36 may be referred to as high-power circuitry 50 and components intermediate switch device circuitry 44 and second interface 38 may be referred to as low-power circuitry 52.

As shown in FIG. 3, first interface 36 is configured to removably electrically couple with connector 16, which may comprise a high-power connector, and second interface 38 is configured to removably electrically couple with connector 18, which may be referred to as a low-power connector. Connector 16 is coupled with a supply 60, such as an AC adapter providing rectified electrical energy, and a high-power load 62, such as a notebook computer in the illustrated arrangement. Low-power connector 18 is coupled with a low-power load 64, such as a mobile telephone, PDA, etc.

As described further below, interfaces 36, 38 are coupled with and provide electrical energy from storage circuitry 30 to respective loads 62, 64 using respective connectors 16, 18. In addition, first interface 36 is arranged in the exemplary embodiment to receive electrical energy from supply 60 coupled with connector 16. Further, interfaces 36, 38 are arranged to receive control signals from connectors 16, 18 which control operations of circuitry 34 (e.g., voltage conversion operations) as described in more detail herein.

Supply 60 and storage circuitry 30 provide electrical energy for usage within high-power load 62 and/or low-power load 64. Referring to operations of circuitry 50, one or both of supply 60 and high-power load 62 may be coupled with connector 16 at any given time. As discussed further below, when supply 60 is coupled with high-power connector 16, boost converter 40 is disabled and high-power load 62 receives electrical energy from supply 60. If high-power load 62 is not utilizing maximum electrical energy from supply 60 (i.e., not consuming all available power from supply 60), such reserve or extra remaining energy may be utilized to charge storage circuitry 30 using charge circuitry 42. When supply 60 is not coupled with high-power connector 16 and connector 16 is coupled with interface 36, boost converter 40 is enabled to supply electrical energy from storage circuitry 30 to high-power load 62.

Figure 7A:
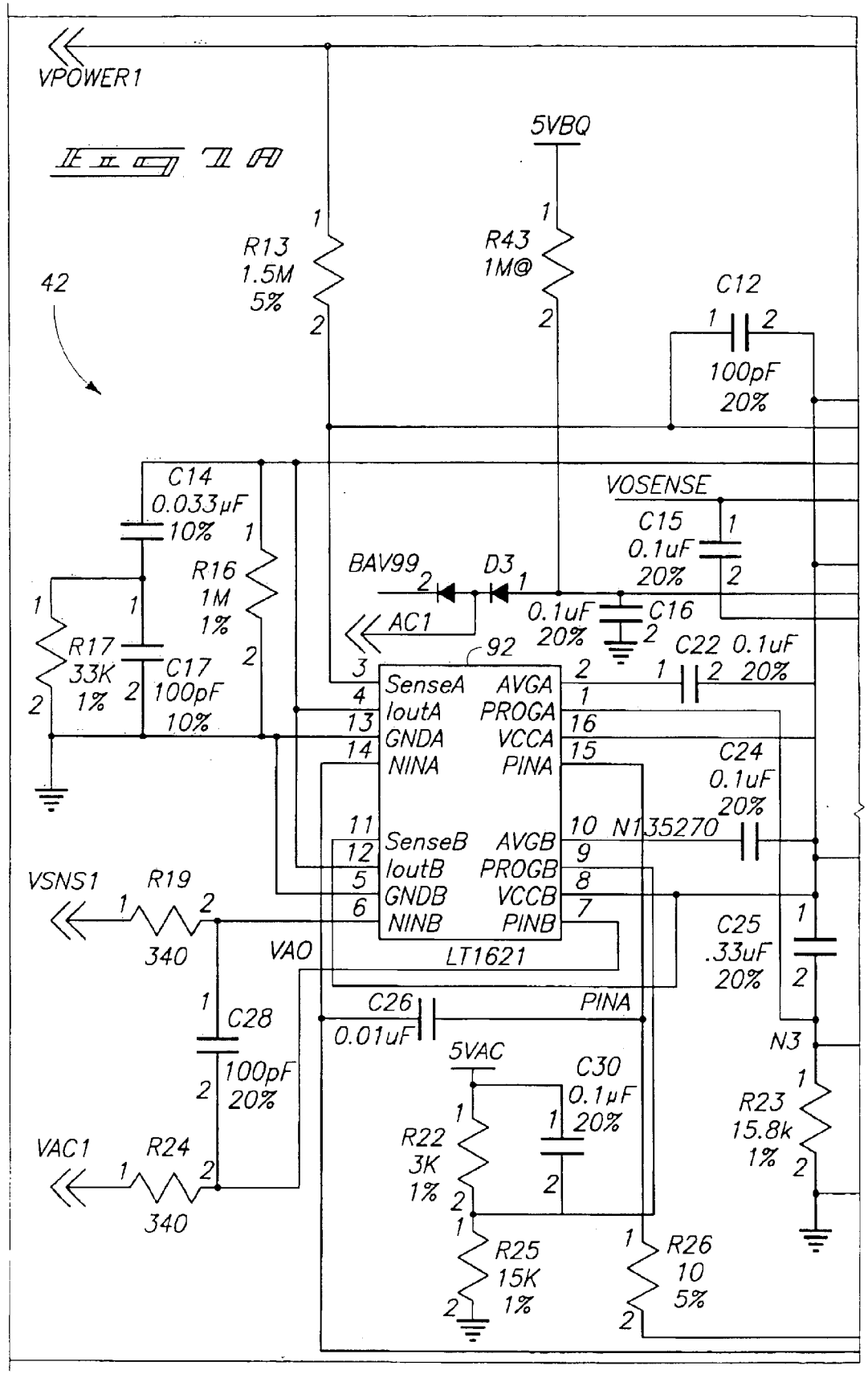

Charge circuitry 42 is configured to control and implement charging and conditioning operations of storage circuitry 30. Charge circuitry 42 is coupled intermediate first interface 36 and storage circuitry 30 including one or more electrochemical device 32. In an exemplary configuration, charge circuitry 42 is implemented as a current sense circuit having product designation LT1621 available from Linear Technology Corporation and a battery charger having product designation LTC1735 available from Linear Technology Corporation. Further components of charge circuitry 42 are illustrated in FIGS. 7A–7C according to one exemplary embodiment.

Charge circuitry 42 is configured to monitor a quantity of electrical energy supplied from supply 60 to high-power load 62. Responsive to such monitoring, charge circuitry 42 controls a supply of electrical energy from supply 60 to storage circuitry 30 to charge one or more electrochemical device 32. Charge circuitry 42 is arranged in the described configuration to assure that load 62 receives adequate electrical energy for proper operation.

In one possible embodiment, high-power connector 16 includes a sense resistor which is utilized by charge circuitry 42 to implement monitoring operations of energy being provided by supply 60 to load 62 and/or circuitry 34. An exemplary sense resistor is depicted in FIG. 6 as reference 70 and is coupled with charge circuitry 42. The sense resistor is coupled in series with supply 60 to monitor electrical energy received from supply 60 within high-power connector 16 and to be provided to high-power load 62 and/or circuitry 34. If a voltage drop across the sense resistor exceeds a predetermined value (e.g., 80 mV), charge circuitry 42 reduces or impedes current drawn by circuitry 34 from high-power connector 16 for charging or other operations to assure that high-power load 62 receives appropriate electrical power for proper operation. If not all available electrical energy from supply 60 is utilized to power load 62, such electrical energy is utilized by charge circuitry 42 to charge and/or maintain storage circuitry 30 and/or provide power to low-power load 64.

Capacity monitor 46 is configured to monitor a state of charge of electrochemical devices 32 of storage circuitry 30.

Capacity monitor 46 is coupled with switch device circuitry 44 and is configured to control such switch device circuitry 44 responsive to the monitoring. In one embodiment, switch device circuitry 44 includes a charge field effect transistor (FET) and a discharge field effect transistor which are controlled to implement charging, discharging and maintenance operations. In one arrangement, capacity monitor 46 is implemented using product designation BQ2060, available from Texas Instruments Incorporated.

Boost converter 40 is coupled intermediate storage circuitry 30 and first interface 36. Boost converter 40 is configured to receive electrical energy from storage circuitry 30 and to increase a voltage of the electrical energy. According to an exemplary embodiment wherein storage circuitry 30 includes four series coupled lithium cell electrochemical devices 32, electrical energy having a nominal voltage of 13.2 Volts is provided and received by boost converter 40. Exemplary high-power loads (e.g., notebook computers) utilize electrical energy at a voltage of approximately 19.4 Volts. Boost converter 40 in one exemplary configuration increases the voltage of electrical energy received from storage circuitry 30 (e.g., 13.2 Volts) to electrical energy having an increased voltage (e.g., 19.5 Volts). As described further below, connector 16 is arranged in at least one configuration to control the output voltage of converter 40 corresponding to the respective load 62 coupled with connector 16.

As mentioned above, boost converter 40 is configured to operate in an enabled mode of operation and a disabled mode of operation. Upon connection or coupling of high-power connector 16 with interface 36, boost converter 40 is provided in the enabled mode of operation. When high-power connector 16 is coupled with a supply 60 and receives electrical energy therefrom (and connector 16 is also coupled with interface 36), boost converter 40 is provided in a disabled mode of operation wherein the boost converter 40 ceases provision of electrical energy to first interface 36. In one exemplary arrangement, boost converter 40 is configured to detect the presence of supply 60 and to enter the disabled mode of operation responsive to the detection of the presence of the supply 60. During operation in the enabled mode of operation, boost converter 40 provides electrical energy of an increased voltage to first interface 36 for application to load 62.

As mentioned, individual loads 62, 64 may have different configurations and utilize electrical energy having different electrical characteristics (e.g., different voltages). Boost converter 40 is configured in at least one embodiment to accommodate different configurations of load 62 which may be coupled with first interface 36. For example, the voltage of electrical energy outputted from converter 40 may be tailored to the specific load 62. In one embodiment, connector 16 controls the output voltage of converter 40.

Connector 16 is configured for use with the respective high-power load 62. For example, receptacles and connection configurations of high-power connector 16 are arranged according to the design of high-power load 62. Internal circuitry of high-power connector 16 may also be tailored for the respective configuration of high-power load 62. In one arrangement, high-power connector 16 includes a resistor to define the voltage of electrical energy outputted from boost converter 40.

An exemplary embodiment of high-power connector 16 is shown in FIG. 6. The depicted configuration of connector 16 includes a pull-down resistor 72 which is coupled with boost converter 40 to control the output voltage. As shown in FIG. 6, the exemplary pull-down resistor has a value of 6.19 kOhms which provides a regulated output voltage of approximately 19.5 Volts from converter 40 when used with a pull-up resistor 74 shown in the exemplary configuration of boost converter 40 illustrated in FIGS. 8A–8B and having a resistance of 90.7 kOhms. Different high-power connectors 16 may include respective pull-down resistors 72 of different values to provide electrical energy of different voltages which correspond to respective high-power loads 62 for which the high-power connectors 16 will be used. In the described arrangement, connector 16 including resistor 74 is configured to control boost converter 40 to provide electrical energy of a substantially constant voltage corresponding to a respective load 62. Although the voltage of electrochemical devices 32 of storage circuitry 30 may decrease during discharging, boost converter 40 is arranged to provide electrical energy to a first interface 36 and load 62 having a substantially constant voltage according to resistors 72, 74.

As illustrated in FIG. 3, electrical energy is provided for utilization within low-power load 64. The depicted exemplary configuration of low-power circuitry 52 includes step-down converter 48 intermediate switch device circuitry 44 and second interface 38. Step-down converter 48 is operable to provide electrical energy having different electrical characteristics (e.g., electrical energy of different voltages) corresponding to particular loads 64 coupled with second interface 38 similar to converter 40.

Step-down converter 48 is arranged to receive electrical energy from electrochemical device 32, to decrease a voltage of the electrical energy received from electrochemical device 32, and to provide the electrical energy of the decreased voltage to second interface 38 for application to load 64 coupled therewith. Connector 18 controls the outputted voltage of converter 48 in the described embodiment. With reference to an exemplary connector 18 shown in FIG. 9, a pull-down resistor 76 having a value of 34 kOhms is utilized to control the voltage of electrical energy provided to low-power load 64. Different low-power connectors 18 may have different pull-down resistors 76 providing different resistance values which correspond to the low-power load 64 to be utilized with power supply apparatus 10. Accordingly, other pull-down resistors 76 may be provided within other configurations of low-power connector 18 if such respective loads 64 utilize electrical energy having different voltages.

In the described arrangement, circuitry 34 is arranged to apply electrical energy from supply 60 to storage circuitry 30 to charge and/or maintain electrochemical devices 32 and to apply electrical energy from storage circuitry 30 to first interface 36 and/or second interface 38 for application to respective present loads 62, 64. Converters 40, 48 are configured to receive electrical energy which may have a variable voltage from storage circuitry 30 and to provide electrical energy of a substantial constant voltage for application to respective loads 62, 64.

Although converter 40 is configured as a boost converter and converter 48 is configured as a step-down converter in the described exemplary embodiment, the converters 40, 48 may be individually configured to implement other conditioning operations corresponding to the respective loads 62, 64. For example, converter 40 may be arranged to reduce the voltage of received electrical energy and converter 48 may be arranged to increase the voltage of received electrical energy in other exemplary embodiments.

FIGS. 4–10 depict exemplary circuit configurations of components shown in FIG. 3. The depicted circuit configurations comprise exemplary arrangements according to aspects of the invention. Other configurations are possible. In addition, the configuration of power supply apparatus 10 shown in FIG. 3, and the depicted components thereof, are exemplary and other arrangements including more, less or other components are possible.

Referring to FIG. 4, an exemplary configuration of first interface 36 is illustrated. First interface 36 comprises a connection device 80 configured to couple with high-power connector 16 (FIG. 6). The illustrated connection device 80 includes six pins for coupling with high-power connector 16.

VAC1 shown in FIG. 4 identifies electrical energy received from supply 60. VAC1 and VSNS1 of FIG. 4 are coupled with sense resistor 70 of FIG. 6 and are utilized by charge circuitry 42 (FIGS. 7A–7C) to control the amount of current drawn from supply 60 via VPOWER1 by charge circuitry 42 to maintain and/or charge storage circuitry 30.

VOUT1 is electrical energy received from boost converter 40 to be applied to load 62. NBCONP controls the switching device FET 82 to selectively couple the boost converter 40 with connector 16. Upon coupling of connector 16 with interface 36, NBCOMP is pulled low by connector 16 which enables boost converter 40 and turns on FET 82 to couple boost converter 40 with connector 16 enabling application of electrical energy from converter 40 to load 62. NBVID is a signal from pull-down resistor 72 of connector 16 and is utilized to set an output voltage of boost converter 40.

Figure 9:
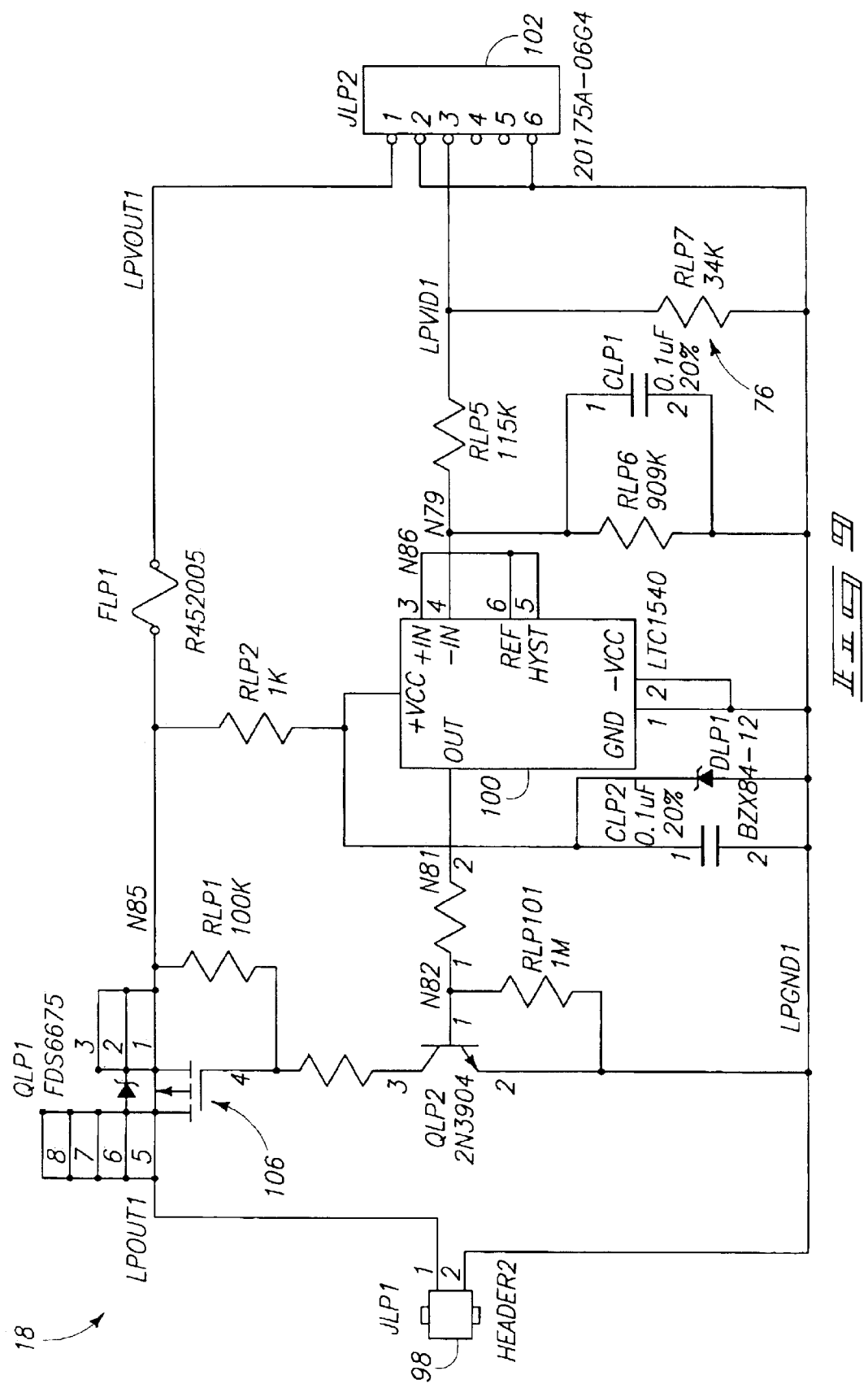
FIG. 9 is a schematic diagram of an exemplary low-power connector of a power supply apparatus.

Referring to FIG. 5, an exemplary configuration of second interface 38 is illustrated. Second interface 38 comprises a connection device 84 configured to couple with low-power connector 18 (FIG. 9). The illustrated connection device 84 includes six pins for coupling with low power connector 18.

Referring to FIG. 6, an exemplary configuration of high-power connector 16 is illustrated. Connector 16 includes sense resistor 70, pull-down resistor 72, and a connection device 86 to couple with connection device 80 of the interface 36. The pin numbering of device 86 is inverted relative to device 80 (e.g., pin 1 of device 80 couples with pin 6 of device 86). A connection device 88 is provided to couple with supply 60 and connection device 90 provides electrical coupling with load 62.

Referring to FIGS. 7A–7C, an exemplary configuration of charge circuitry 42 is illustrated according to the map of FIG. 7. Charge circuitry 42 includes a current sense device 92, having product designation LT1621 and available from Linear Technology Corporation, and a battery charger device 94, having product designation LTC1735 and available from Linear Technology Corporation. When the input current on VPOWER1 exceeds a set threshold (e.g., 3.4 A), device 92 pulls the ITH signal low to slow down the operation of device 94 enabling more power to be delivered to load 62 from supply 60. In addition, VSNS1 and VAC1 are current sense lines for input power limiting and are run differentially to device 92. VCHARGE is coupled with storage circuitry 30 via switch device circuitry 44 and corresponds to electrical energy applied to devices 32.

Figure 8A:
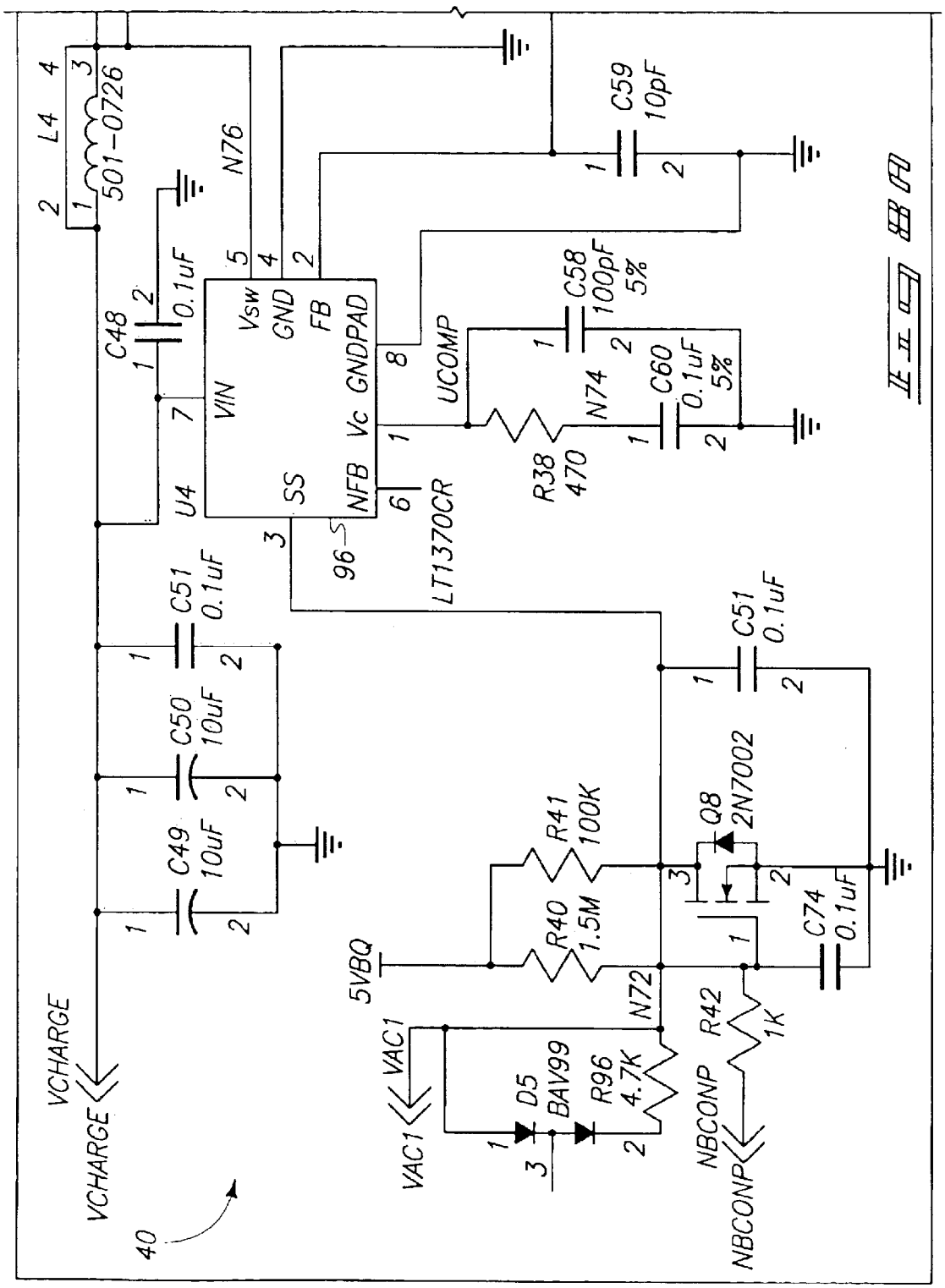
FIGS. 8A–8B are to be arranged.
Figure 8B:
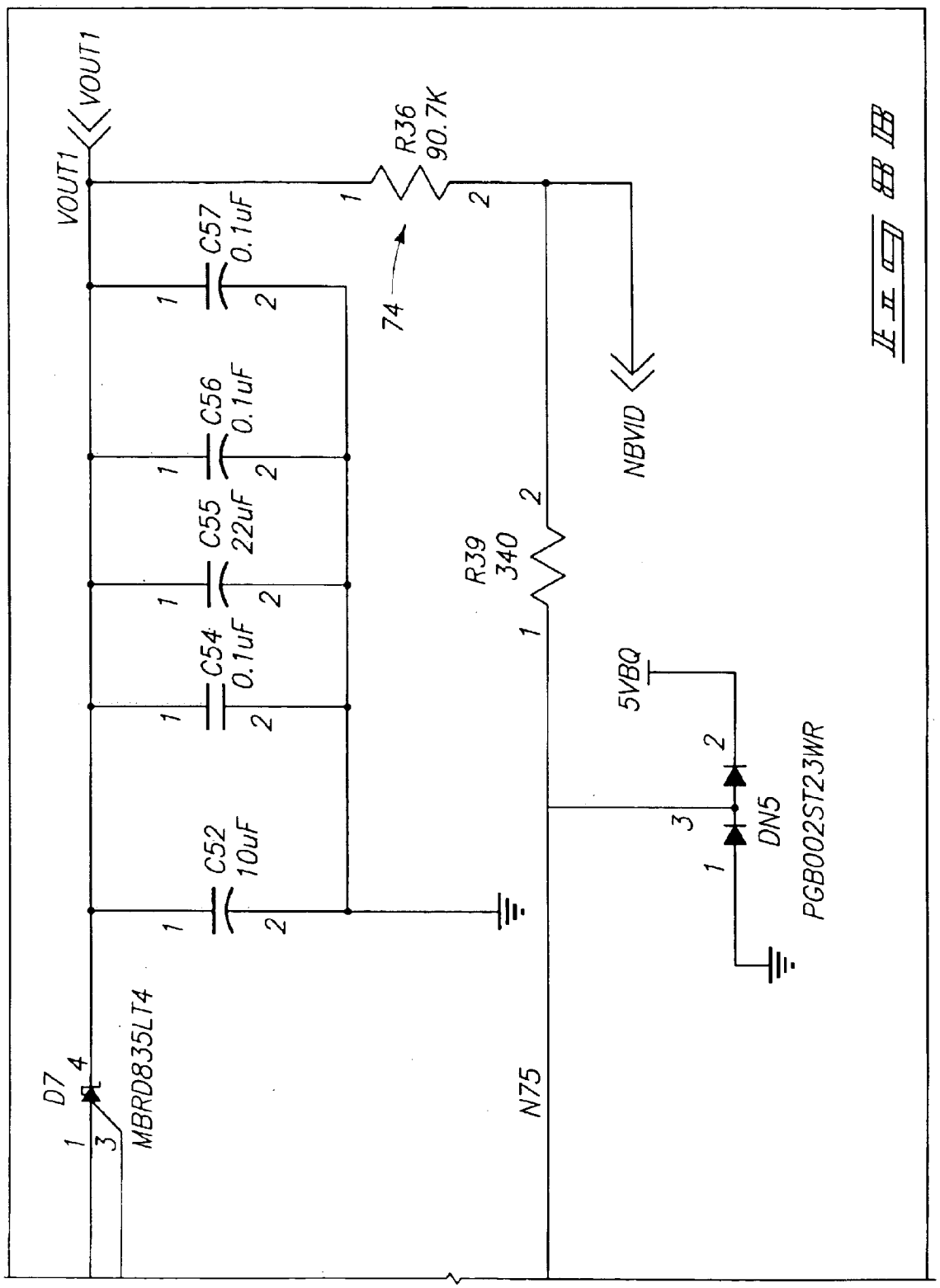

Referring to FIGS. 8A–8B, an exemplary configuration of boost converter 40 is illustrated according to the map of FIG. 8. Boost converter 40 includes pull-up resistor 74 and an integrated circuit 96 having product designation LT1370CR available from Linear Technology Corporation. VCHARGE is electrical energy received from storage circuitry 30 via switch device circuitry 44. VOUT1 is electrical energy having an increased voltage for application to first interface 36 and load 62.

NBCOMP is pulled low upon coupling of high-power connector 16 with interface 36 which enables circuit 96. However, if supply 60 is also coupled with and providing electrical energy to connector 16, then VAC1 over-rides NBCOMP to disable circuit 96 and boost converter 40.

Referring to FIG. 9, an exemplary arrangement of low-power connector 18 is shown. The depicted connector 18 includes pull-down resistor 76, a connection device 98, an integrated circuit 100 having product designation LTC1540, available from Linear Technology Corporation, and a connection device 102. Connection device 98 is configured to couple with low-power load 64. Integrated circuit 100 is configured to disable FET 106 if a failure or short occurs (e.g., step-down converter 48 fails) to protect load 64. Connection device 102 is configured to couple with connection device 84 of interface 38 (the pin numbers of devices 84 and 102 are inverted with respect to one another).

Figure 10A:
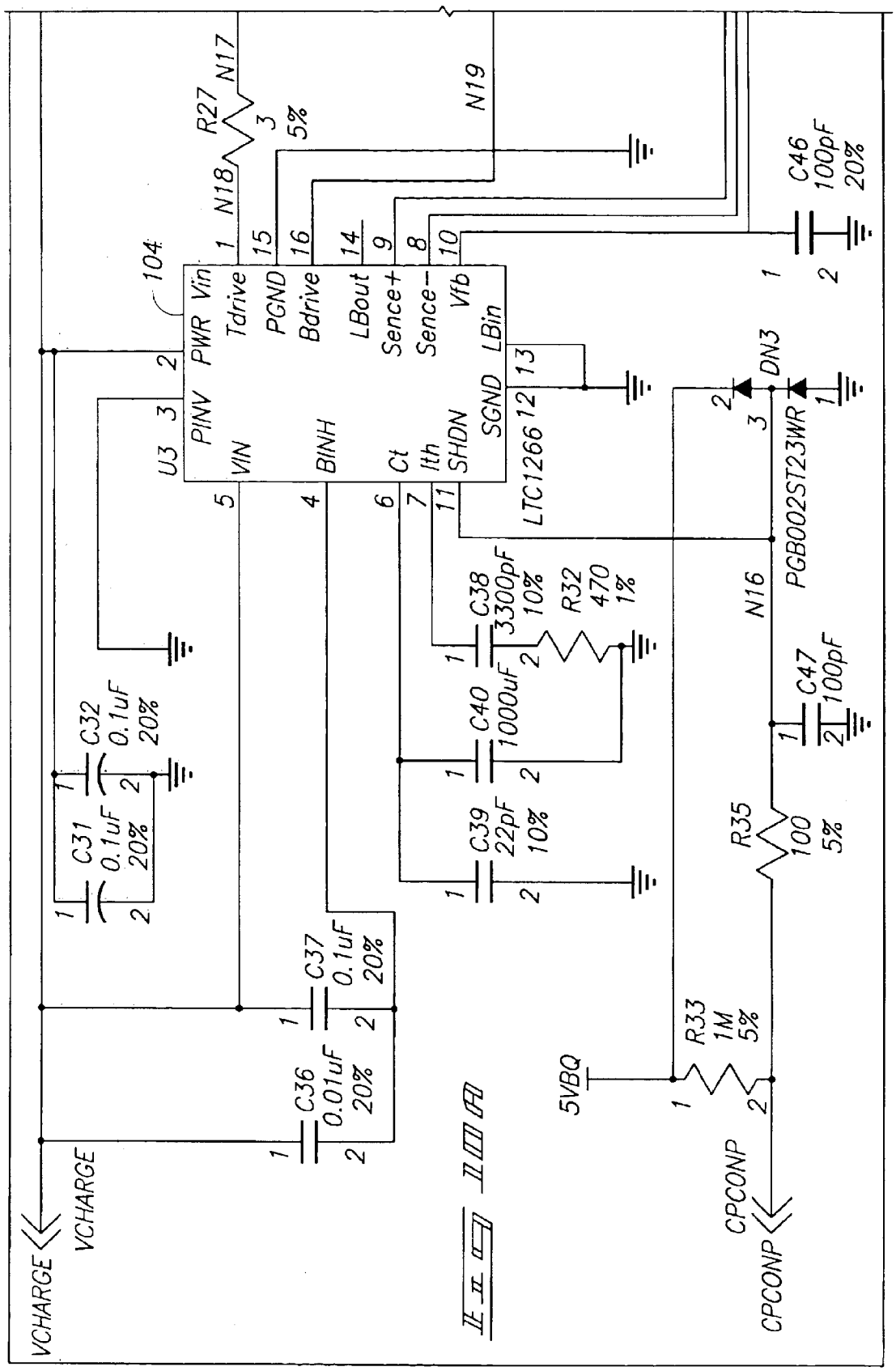
FIGS. 10A–10B are to be arranged.
Figure 10B:
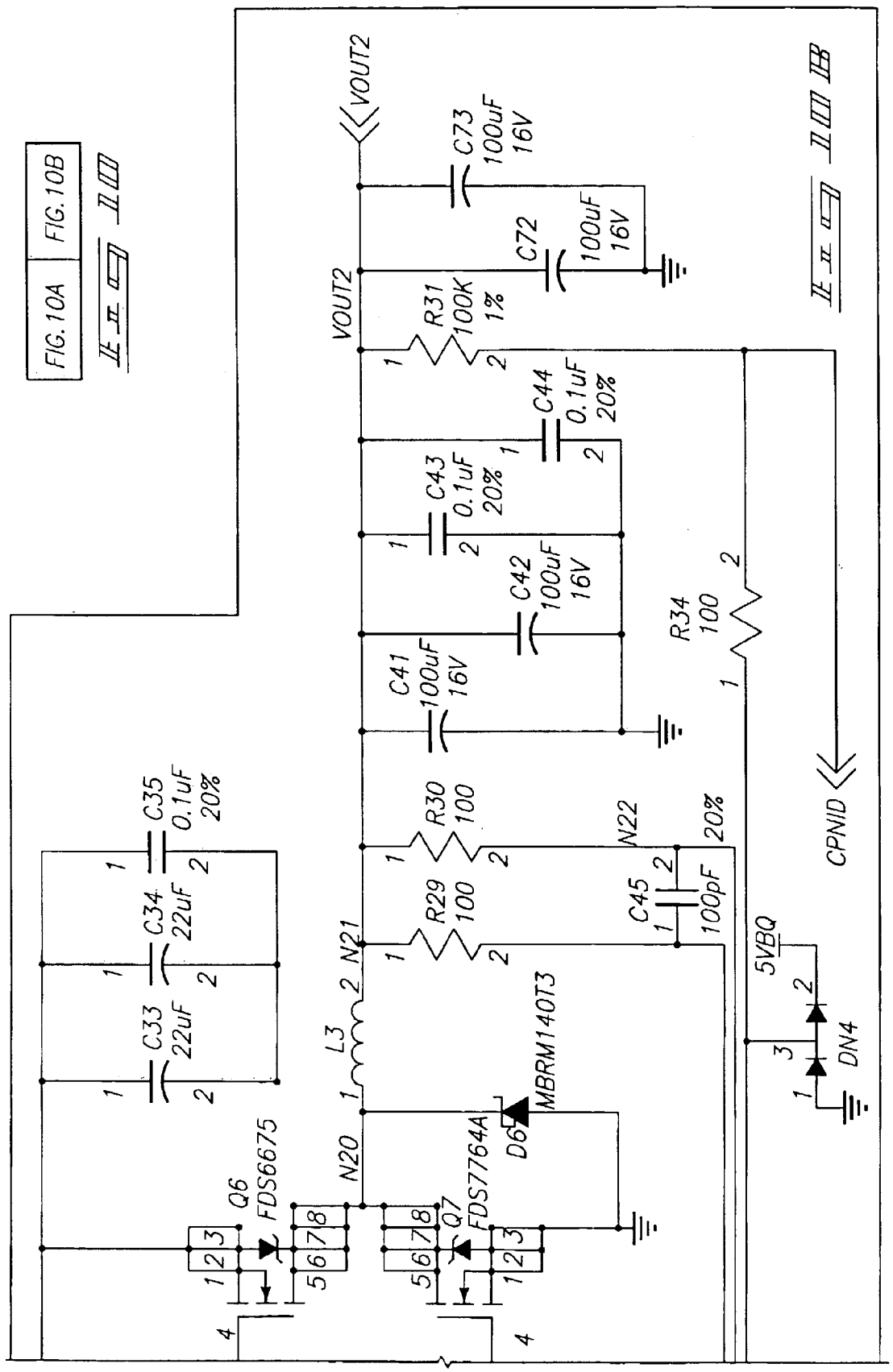

FIGS. 10A–10B show an exemplary arrangement of step-down converter 48 according to the map of FIG. 10. Converter 48 includes an integrated circuit device 104 having product designation LTC1266 available from Linear Technology Corporation. VCHARGE is electrical energy received from storage circuitry 30 via circuitry 44. VOUT2 is converted electrical energy applied to second interface 38 for application to load 64.

CPCONP from interface 38 (FIG. 5) is pulled low by connector 18 responsive to coupling of connector 18 with interface 38 to enable device 104 and converter 48 and enable provision of electrical energy from converter 48 to interface 38. Pull-down resistor 76 (FIG. 9) provides a signal LPVID1, CPVID which operates to set the output voltage of electrical energy applied from converter 48 to interface 38. In the depicted exemplary embodiment of resistor 76 being 34 kOhms, an output voltage of approximately 5 Volts is provided. Other resistors 76 having different resistance values may be utilized to provide other output voltages of converter 48.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any its forms or modifications within the proper scope of the appended claims appropriately interpreted in accordance with the doctrine of equivalents.

What is claimed is:

1. An electrical energy apparatus comprising:
    an interface configured to couple with a supply configured to provide electrical energy and an electrical load configured to consume electrical energy; and
    conditioning circuitry coupled with the interface and electrical storage circuitry configured to store electrical energy, wherein the conditioning circuitry comprises converter circuitry configured to modify an electrical characteristic of the electrical energy of the electrical storage circuitry and to supply the electrical energy of the electrical storage circuitry to the load after the modification and during an enabled mode of operation of the converter circuitry, wherein the converter circuitry is provided in a disabled mode of operation responsive to the presence of the supply providing the electrical energy.

2. The apparatus of claim 1 wherein the converter circuitry is provided in the disabled mode of operation responsive to the presence of the supply providing electrical energy to the conditioning circuitry.

3. The apparatus of claim 1 wherein the converter circuitry is provided in the disabled mode of operation responsive to the presence of the supply providing electrical energy to the electrical load.

4. The apparatus of claim 1 further comprising a connector configured to removably couple with the interface, and wherein a coupling of the connector with the interface changes a mode of operation of the converter circuitry from the disabled mode of operation to the enabled mode of operation in the absence of the supply providing the electrical energy.

5. The apparatus of claim 1 wherein the converter circuitry comprises boost converter circuitry configured to increase a voltage of the electrical energy of the electrical storage circuitry from a first voltage to a second voltage greater than the first voltage.

6. The apparatus of claim 1 further comprising the electrical storage circuitry comprising an electrochemical storage device.

7. The apparatus of claim 6 wherein the electrochemical storage device comprises a lithium cell having a lithium-mixed metal electrode.

8. The apparatus of claim 1 where in the conditioning circuitry comprises charge circuitry configured to apply electrical energy from the supply to the electrical storage circuitry.

9. The apparatus of claim 8 wherein the charge circuitry is configured to monitor a quantity of electrical energy provided from the supply and to control a quantity of the electrical energy applied from the supply to the electrical storage circuitry responsive to the monitoring.

10. An electrical energy apparatus comprising:
an interface configured to couple with electrical storage circuitry and a plurality of types of electrical loads configured to utilize electrical energy having different electrical characteristics, wherein the electrical storage circuitry is configured to store electrical energy and the interface is configured to supply electrical energy from the electrical storage circuitry to an electrical load coupled with the interface and comprising one of the plurality of types; and
conditioning circuitry coupled intermediate the interface and the electrical storage circuitry and configured to modify an electrical characteristic of the stored electrical energy prior to application of the stored electrical energy to the electrical load, wherein the conditioning circuitry is configured to implement the modification corresponding to the electrical characteristic of the electrical load.

11. The apparatus of claim 10 wherein the electrical load coupled with the interface comprises an initial electrical load coupled with the interface at an initial moment in time, and further comprising an other electrical load coupled with the interface at an other moment in time and configured to utilize electrical energy having an electircal characterisitic different than the electrical characterisitic of the initial electrical load, and wherein the power conditioning circuitry is configured to modify the electrical characteristic of the stored electrical energy according to the electrical characteristic of the other electrical load at the other moment in time.

12. The apparatus of claim 10 further comprising a connector configured to couple with the electrical load and the interface and wherein the connector is configured to control the modification of the electrical characteristic of the stored electrical energy by the conditioning circuitry according to the electrical characteristic of the electrical load.

13. The apparatus of claim 12 further comprising a plurality of the connectors configured to control the modification of the electrical characteristic of the stored electrical energy by the conditioning circuitry according to the different electrical characteristics of the different electrical loads.

14. The apparatus of claim 10 wherein the conditioning circuitry is configured to modify the electrical characteristic comprising a voltage of the stored electrical energy.

15. The apparatus of claim 10 further comprising the electrical storage circuitry comprising an electrochemical storage device.

16. The apparatus of claim 15 wherein the electrochemical storage device comprises a lithium cell having a lithium-mixed metal electrode.

17. The apparatus of claim 10 wherein the conditioning circuitry comprises charge circuitry coupled with the interface and the electrical storage circuitry, and wherein the charge circuitry is configured to control charging of the electrical storage circuitry, to monitor a quantity of electrical energy supplied from a supply coupled with the interface, and to adjust the charging of the electrical storage circuitry responsive to the monitoring.

18. The apparatus of claim 10 wherein the conditioning circuitry comprises converter circuitry configured to adjust the electrical characteristic comprising voltage of the stored electrical energy, and wherein the converter circuitry is disabled responsive to the presence of a supply supplying electrical energy to the electrical load.

19. An electrical energy apparatus comprising:
first means for providing electrical energy from a supply to an electrical load;
second means for providing electrical energy from electrical storage circuitry to the electrical load, wherein the second means further comprises means for receiving the electrical energy from the electrical storage circuitry, for modifying an electrical characteristic of the electrical energy received from the electrical storage circuitry, and for applying the electrical energy received from the electrical storage circuitry to the electrical load after the modifying; and
means for disabling the providing of the electrical energy from the electrical storage circuitry to the electrical load during the providing of the electrical energy from the supply to the electrical load.

20. An electrical energy conditioning circuit comprising:
an interface configured to couple with a supply configured to supply electrical energy and an electrical load configured to consume electrical energy; and
charge circuitry coupled with the interface and electrical storage circuitry configured to store electrical energy, wherein the charge circuitry is configured to control charging of the electrical storage circuitry, to monitor a quantity of electrical energy supplied from the supply, and to adjust the charging of the electrical storage circuitry responsive to the monitoring.

21. The circuit of claim 20 wherein the charge circuitry is configured to provide the charging of the electrical storage circuitry using electrical energy from the supply.

22. The circuit of claim 21 wherein the charge circuitry is configured to monitor the quantity of electrical energy with respect to a threshold and to reduce a quantity of the electrical energy used from the supply to charge the electrical storage circuitry responsive to the quantity of the electrical energy from the supply exceeding the threshold.

23. The circuit of claim 22 further comprising a connector coupled with the interface and configured to couple with at least one of the supply and the electrical load, and wherein the connector is further configured to set the threshold.

24. The circuit of claim 20 wherein the charge circuitry is configured to monitor electrical energy supplied from the supply to the electrical load and the electrical storage circuitry to monitor the quantity of the electrical energy.

25. The circuit of claim 20 further comprising the electrical storage circuitry comprising at least one electrochemical storage device.

26. The circuit of claim 25 wherein the electrochemical storage device comprises a lithium cell having a lithium-mixed metal electrode.

27. An electrical energy supply method comprising:
providing electrical energy from electrical storage circuitry to an electrical load;
providing electrical energy from a supply to the electrical load;
providing electrical energy from the supply to the electrical storage circuitry to charge the electrical storage circuitry;
monitoring a quantity of electrical energy provided by the supply; and
adjusting a quantity of the electrical energy provided by the supply and used to charge the electrical storage circuitry responsive to the monitoring.

28. The method of claim 27 wherein the monitoring comprises monitoring the quantity of the electrical energy provided from the supply to the electrical load.

29. The method of claim 27 wherein the monitoring comprises monitoring the quantity of the electrical energy provided from the supply to the electrical storage circuitry.

30. The method of claim 27 wherein the monitoring comprises monitoring the quantity of the electrical energy provided from the supply to the electrical load and the electrical storage circuitry.

31. The method of claim 27 wherein the monitoring comprises comparing the quantity to a threshold, and wherein the adjusting comprises reducing the quantity responsive to the quantity exceeding the threshold.

32. An electrical energy supply method comprising:
first providing electrical energy from a supply to an electrical load;
second providing electrical energy from electrical storage circuitry to the electrical load, the second providing comprising:
receiving electrical energy from the electrical storage circuitry;
modifying an electrical characteristic of the electrical energy received from the electrical storage circuitry; and
applying the electrical energy received from the electrical storage circuitry to the electrical load after the modifying; and
disabling the second providing of the electrical energy from the electrical storage circuitry to the electrical load during the first providing of the electrical energy from the supply to the electrical load.

33. The method of claim 32 wherein the first providing and disabling occur at a first moment in time and the second providing occurs at a second moment in time different than the first moment in time.

34. The method of claim 32 further comprising third providing electrical energy from the supply to the electrical storage circuitry to charge the electrical storage circuitry.

35. The method of claim 34 further comprising monitoring a quantity of electrical energy provided by the supply, and adjusting a quantity of the electrical energy provided by the supply during the third providing and responsive to the monitoring.

36. The method of claim 32 wherein the modifying comprises modifying the electrical characteristic comprising voltage of the electrical energy.

37. The method of claim 32 wherein the modifying comprises modifying using converter circuitry configured to implement different modifications of the electrical characteristic of the electrical energy corresponding to a plurality of different electrical loads having a plurality of different electrical characteristics, and wherein the modifying further comprises modifying according to the electrical characteristic of the electrical load receiving the electrical energy during the first and the second providings.

38. The method of claim 32 further comprising providing the electrical storage circuitry.

39. The method of claim 38 further comprising providing the electrical storage circuitry comprising a lithium cell having a lithium-mixed metal electrode.

40. An electrical energy supply method comprising:
storing electrical energy using electrical storage circuitry;
modifying at least one electrical characteristic of the electrical energy from the electrical storage circuitry, wherein the modifying comprises modifying according to one of a plurality of possible different parameters;
applying the electrical energy from the electrical storage circuitry to an electrical load after the modifying; and
selecting the one of the parameters corresponding to the electrical load receiving the electrical energy.

41. The method of claim 40 further comprising:
providing a plurality of different connectors corresponding to a plurality of different electrical loads; and
selecting one the connectors corresponding to the electrical load receiving the electrical energy, and wherein the selecting the one of the connectors selects the one of the parameters.

42. The method of claim 41 wherein the parameter comprises electrical resistance.

43. The method of claim 40 further comprising providing the electrical storage circuitry.

44. The method of claim 43 further comprising providing the electrical storage circuitry comprising a lithium cell having a lithium-mixed metal electrode.

* * * * *

UNITED STATES PATENT AND TRADEMARK OFFICE
CERTIFICATE OF CORRECTION

PATENT NO. : 6,765,368 B2  Page 1 of 1
DATED : July 20, 2004
INVENTOR(S) : Stone et al.

It is certified that error appears in the above-identified patent and that said Letters Patent is hereby corrected as shown below:

Title page,
Item [54], Title, please insert -- ENERGY -- after "ELECTRICAL".

Column 11,
Line 57, please delete "electircal" after "an" and insert -- electrical --.

Signed and Sealed this

First Day of February, 2005

JON W. DUDAS
*Director of the United States Patent and Trademark Office*